United States Patent [19]
Banham et al.

[11] Patent Number: 6,141,453
[45] Date of Patent: Oct. 31, 2000

[54] METHOD, DEVICE AND DIGITAL CAMERA FOR ERROR CONTROL AND REGION OF INTEREST LOCALIZATION OF A WAVELET BASED IMAGE COMPRESSION SYSTEM

[75] Inventors: Mark R. Banham, Arlington Heights, Ill.; Salma Soudagar, Geneva, Switzerland; James C. Brailean, Park Ridge, Ill.

[73] Assignee: Motorola, Inc., Schaumburg, Ill.

[21] Appl. No.: 09/022,264

[22] Filed: Feb. 11, 1998

[51] Int. Cl.$^7$ ................................ G06K 9/36; G06K 9/46
[52] U.S. Cl. ......................... 382/240; 382/232; 382/233
[58] Field of Search ................................... 382/232, 233, 382/240, 248

[56] References Cited

U.S. PATENT DOCUMENTS

5,850,482  12/1998  Meany et al. ........................... 382/232

Primary Examiner—Bhavesh Mehta
Attorney, Agent, or Firm—Douglas D. Fekete

[57] ABSTRACT

The present invention provides a method (200, 400, 500, 600), device (300, 400, 500, 600, 700) and digital camera (800) for error control of a wavelet-based image codec, wherein wavelet coefficients are encoded using entropy coding. The method includes: A) utilizing, in a decoder, control information and a plurality of resynchronization markers inserted at arbitrary positions in a wavelet-based image bitstream wherein the control information provides decoding information for decoding at least a forward sequence of wavelet coefficients; and B) detecting errors in an image bitstream and limiting propagation of errors in a decoded image utilizing the control information and the plurality of resynchronization markers.

20 Claims, 5 Drawing Sheets

DIAGRAMMATIC REPRESENTATION OF RESYNCHRONIZATION MARKERS+ CONTROL INFORMATION PLACED AT BOUNDARIES OF SUBBANDS OF WAVELET COEFFICIENTS IN A BITSTREAM (102)

DIAGRAMMATIC REPRESENTATION OF RESYNCHRONIZATION MARKERS + CONTROL INFORMATION PLACED AT BOUNDARIES OF BITPLANES OF SUBBANDS OF WAVELET COEFFICIENTS IN A BITSTREAM (104)

DIAGRAMMATIC REPRESENTATION OF RESYNCHRONIZATION MARKERS+CONTROL INFORMATION PLACED AT BOUNDARIES OF BITPLANES OF REGIONS OF INTEREST OR CLASSES OF WAVELET COEFFICIENTS IN THE BITSTREAM (106)  100

■ DIAGRAMMATIC REPRESENTATION OF RESYNCHRONIZATION MARKERS+ CONTROL INFORMATION PLACED AT BOUNDARIES OF SUBBANDS OF WAVELET COEFFICIENTS IN A BITSTREAM

(102)

■ DIAGRAMMATIC REPRESENTATION OF RESYNCHRONIZATION MARKERS + CONTROL INFORMATION PLACED AT BOUNDARIES OF BITPLANES OF SUBBANDS OF WAVELET COEFFICIENTS IN A BITSTREAM (104)

BITPLANE N
•••
BITPLANE 1
BITPLANE 0

☐ DIAGRAMMATIC REPRESENTATION OF RESYNCHRONIZATION MARKERS+CONTROL INFORMATION PLACED AT BOUNDARIES OF BITPLANES OF REGIONS OF INTEREST OR CLASSES OF WAVELET COEFFICIENTS IN THE BITSTREAM (106)   100

(601) MEMORY/ASIC/DSP/FPGA/MICROPROCESSOR (606) COMPUTER PROGRAM

(602) UTILIZING CONTROL INFORMATION AND A PLURALITY OF RESYNCHRONIZATION MARKERS INSERTED AT ARBITARY POSITIONS IN A WAVELET-BASED IMAGE BITSTREAM WHEREIN THE CONTROL INFORMATION PROVIDES DECODING INFORMATIN FOR DEODING AT LEAST A FORWARD SEQUENCE OF WAVELET COEFFICIENTS;

(604) DETECTING ERRORS IN AN IMAGE BITSTREAM AND LIMITING THE PROPAGATION OF ERRORS IN A DECODED IMAGE UTILIZING THE CONTROL INFORMATION AND PLURALITY OF RESYNCHRONIZATION MARKERS.

METHOD, DEVICE AND DIGITAL CAMERA FOR ERROR CONTROL AND REGION OF INTEREST LOCALIZATION OF A WAVELET BASED IMAGE COMPRESSION SYSTEM

FIELD OF THE INVENTION

This invention relates to the encoding and decoding of compressed image bitstreams in the presence of error prone channels. More particularly, this invention pertains to compressed image bitstreams generated using the discrete wavelet transform and its variants.

BACKGROUND OF THE INVENTION

The transmission of compressed images over noisy or error prone channels is a difficult problem, but one which is very relevant to a number of systems in use today. Errors may be injected into a transmitted bitstream in both wired and wireless environments. In the case of wired networks, there are a variety of unreliable transmission protocols which may result in lost packets of information at a decoder due to network congestion. Mobile wireless networks often exhibit Rayleigh fading or burst errors as a result of multipath propagation. These examples are relevant to the transmission of image data because a wide variety of multimedia applications have recently come into existence which require the delivery of image data over such error prone networks. Transmitting image data over the Internet using the User Datagram Protocol (UDP) is one example application which may result in erroneous data at the decoder in the presence of network congestion.

Currently, as is known in the art, the most popular standard for image compression for use in network based multimedia is JPEG (a standardized image compression mechanism developed by the Joint Photographic Experts Group). The JPEG standard is a block based Discrete Cosine Transform (DCT) standard, which transmits the spatial information in a frame in several different ways. The most common use of JPEG is in its baseline form, where the image data appears sequentially in blocks in raster scan order in the bitstream. When a baseline JPEG bitstream is subjected to errors, large spatial portions of the image will be lost. JPEG permits structuring entropy coded data into segments, so it is possible to recover other segments of an image, when errors are localized to a segment.

Another form of JPEG is the progressive mode. In this mode, image data appears not only sequentially in blocks in raster scan order, but also in scans of increasing frequency resolution and/or DCT coefficient accuracy. This mode allows for data to appear in low quality form first at a decoder, and then be decoded and displayed while higher resolution information is still being transmitted. Like the baseline mode, when a progressive JPEG bitstream is subjected to errors, the errors must be localized to predetermined segments in order to contain the propagation of errors to different spatial regions of the image, or to different resolution scans of the image.

The idea of progressive or scalable transmission of image data is a useful one, when considering the effects of errors on the bitstream. While the progressive mode of JPEG provides a piece-wise approximation of "scalability", it does not provide the flexibility that the wavelet transform does in the form of continuously scalable bitstreams. Such bitstreams are ones that may be decoded up to an arbitrary position in the bitstream, where the decoded image is always increasing in quality with subsequent decoded bits. When the data is transmitted in n inherently prioritized fashion, as is enabled by the wavelet transform, it is much easier to obtain useable images in the presence of errors. This is because any data appearing after an error may easily be concealed, or left undecoded, and an image will still appear to look like the expected image. One problem with the existing wavelet based image compression algorithms, however, is that the algorithms are not explicitly designed to be used in the presence of errors. Therefore, although the data may be partitioned in an error resilient manner, the decoder may not be able to localize and conceal the errors without new and enabling technology.

When errors are present in a compressed image bitstream, some means must exist for an image decoder to detect those errors, and to react accordingly in order to localize and conceal those errors before displaying the image. In a system where some residual errors are found at the application layer, it is crucial that the application (in this case a wavelet based image decoder) have the ability to control the effects of those errors.

The concept or detecting and localizing errors is coupled to the problem of detecting and decoding regions of interest in an image. An encoder may need to apply some specific rate control algorithms to an image such that an unequal amount of bits are spent on certain regions of interest in the image. If a decoder is to selectively decode those regions of interest based on demands of certain applications, that selective decoding must be enabled by technology which has the same properties that an error control localization method would have. Those properties would include the ability to detect the boundaries of regions of interest, and continue decoding in a forward direction based on special information found at those boundaries. Such technology does not exist in wavelet based image codecs today.

Thus, there is a need for a method and device for error control and region of interest localization of a wavelet based image compression system.

DETAILED DESCRIPTION OF A PREFERRED EMBODIMENT

The present invention provides a method and device for the reliable error control and region of interest localization of wavelet based compressed image data for use with systems containing an error prone channel. The method is designed to work with any image compression system that generates wavelet based subbands, including, but not limited to, dyadic multiresolution discrete wavelet transforms and arbitrary wavelet packet decompositions. The method is characterized by the following capabilities:

1. Provides both random and burst error protection.
2. Provides a means for detecting errors in a wavelet encoded image bitstream.
3. Limits the propagation of errors within the decoded image.
4. Provides a means to apply error concealment to an error corrupted wavelet encoded image.
5. Provides a means to decode only a region or regions of interest in a wavelet encoded image.

This method provides a format for transmitting segments of wavelet coded image data in an error prone environment. The boundaries of segments of wavelet coded data are signaled by resynchronization markers in the bitstream, followed by special control information to enable the continued decoding of the image in the presence of errors. One problem with compressed image data is that entropy codes such as variable length Huffman codes, or arithmetic codes, are not robust to errors. Such codes are typically used in wavelet-based image coding systems to provide very good compression. The problem of making these codes resilient to errors is one that is pervasive in the world of wireless and error prone communications. Errors in variable length and arithmetic codes propagate until being reset in some manner. Therefore the compression technique must provide for this option if it is to be error resilient.

With wavelet coded image data, it is beneficial to be able to localize the regions of the bitstream in which errors occur, and then conceal those errors using simple coefficient replacement techniques. One example would be to localize errors to a single subband of wavelet coefficients, and then to set all of the coefficients in that subband to zero before applying the inverse wavelet transform. The unique property of wavelet transforms is that the decoded data will still look like the encoded image even in the presence of such concealment. This is a result of the multiresolution prioritization of data that is inherent to wavelet decompositions.

Figure 1:
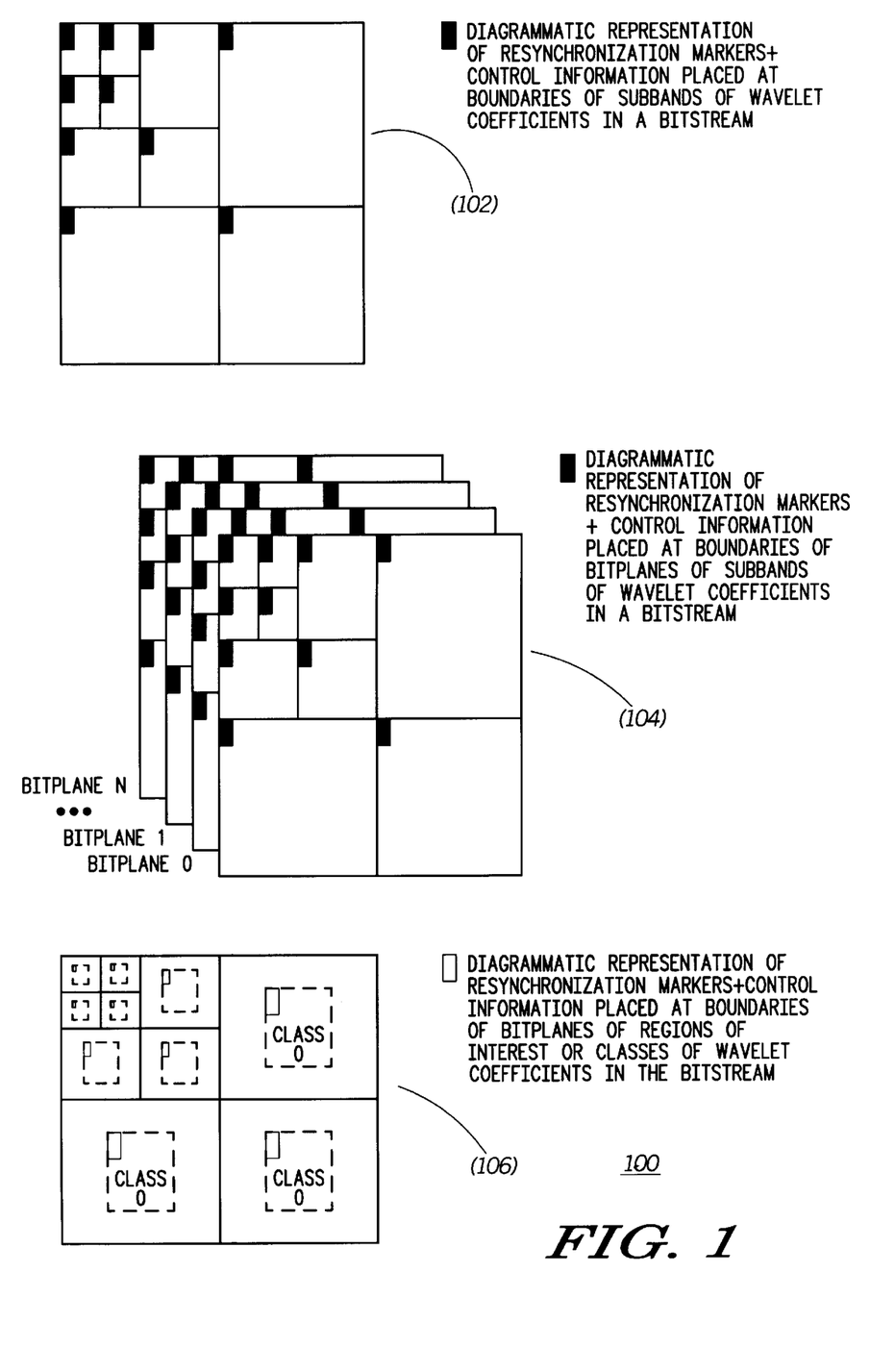
FIG. 1 is a diagrammatic representation of the location of error control and region of interest localization information in accordance with the present invention.

A diagrammatic representation of a wavelet decomposition and several associated error control segmentations of the present invention is shown in FIG. 1, numeral 100. FIG. 1 indicates graphically the location of resynchronization information relative to different bitstream orderings of wavelet coefficients. The diagrams show the dyadic wavelet decomposition tree of an image, which is coded and transmitted in the bitstream here in order of lowest resolution to highest resolution coefficients. FIG. 1, (102), shows the placement of resynchronization markers and control information at the boundaries of each subband in a wavelet decomposition. in the case of such a segmentation, all of the data in each subband could be decoded independently of all other subbands' data. Here, the resynchronization markers and control information contain all of the necessary information to continue decoding, such as the absolute address of the current subband, and the resetting of any predictive coding techniques which might cross a subband border. In another case, the data appears in the bitstream in terms of accuracy, or bitplanes (104). Here resynchronization markers and control information can be placed at the boundary of every bitplane in every subband. In this case, it is possible to recover more significant bitplanes in the presence of errors, and utilize that data in the inverse transform, while localizing and concealing erroneous bitplanes at a finer level of accuracy. Finally, FIG. 1, (106) shows the use of resynchronization markers and control information for the segmentation of classes, or regions of interest, of wavelet coefficients. In (106) one important class, Class 0, is shown. The coefficients associated with this class may form a specific region of interest in the image. With adequate resynchronization and control information, it is possible to localize the decoding with or without errors to the coefficients associated with a specific class (which may be a region of interest). The coefficients in a class need not appear in a contiguous group within the image, as shown here, but could be dispersed throughout the image and contiguously decoded. Both cases require a class map is provided to a decoder in an image header.

Figure 2:
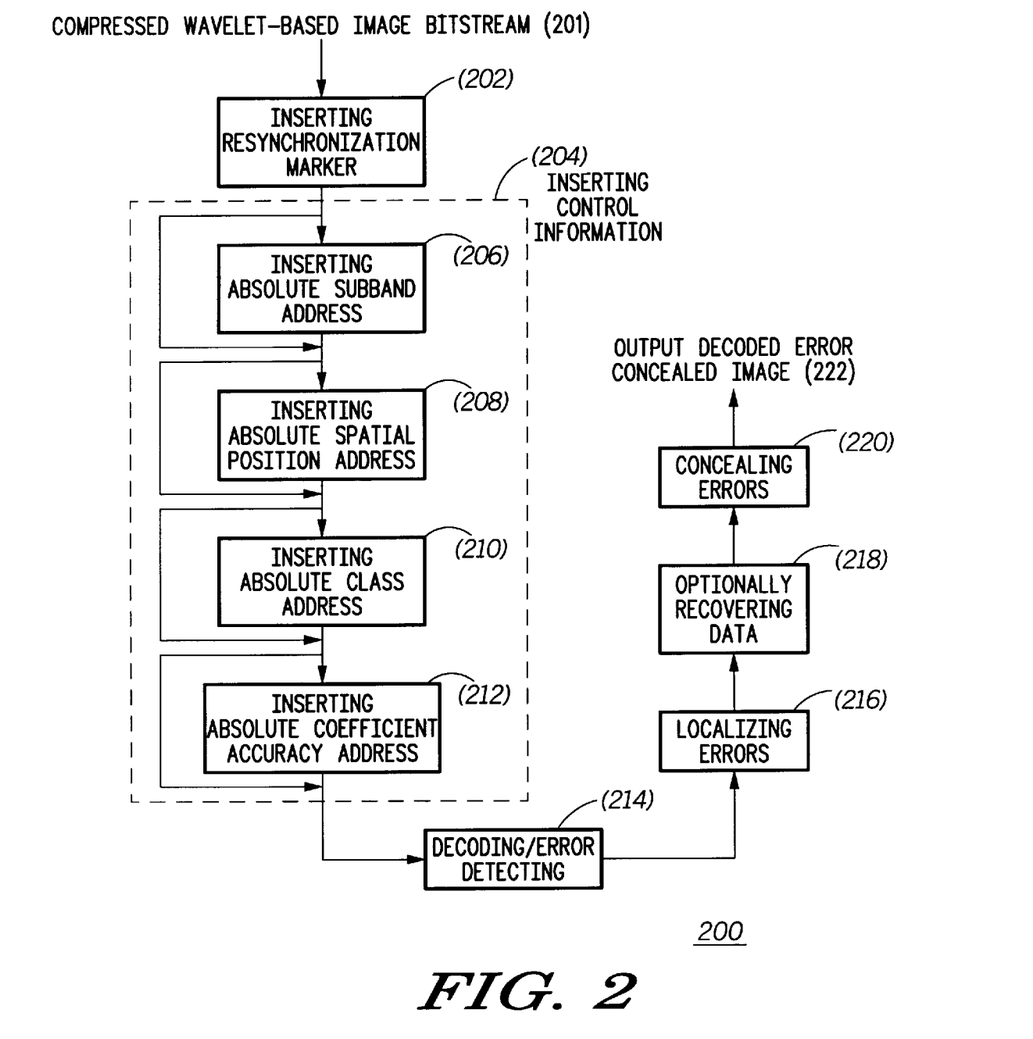
FIG. 2 is a flow chart of a preferred embodiment of steps of a method in accordance with the present invention.

FIG. 2, numeral 200, is a flow diagram of one preferred embodiment of a method in accordance with the present invention. FIG. 2 shows the placement of resynchronization markers (202) and control information (204) in a wavelet-based compressed image bitstream. The placement is controlled by a predetermined user defined scheme in accordance with one or a combination of the approaches described above and represented in FIG. 1, (100). The resynchronization markers in this embodiment are unique codewords in a wavelet coded bitstream, which are not emulated in the entropy coded symbols used to represent quantized wavelet coefficients in the compressed bitstream. Each resynchronization marker is followed by a control information field of a predetermined number of bits, F, in length. The length of the control field is a function of the current subband, and of the predetermined user defined scheme for coding the wavelet coefficients. The components of the control length field are at least one of:

A) an absolute subband address in a predetermined wavelet decomposition scheme (A bits) (206);

B) an absolute spatial position address in a predetermined wavelet subband coefficient scanning scheme (B bits) (208);

C) an absolute class address in a predetermined wavelet coefficient classification scheme (C bits) (210); and D) an absolute coefficient accuracy value in a predetermined variable coefficient accuracy wavelet coding scheme (D bits) (212).

Thus, the total length of the control information field is (A+B+C+D) bits. In a predetermined wavelet decomposition scheme where the maximum number of wavelet subbands is $N_A$, A=Ceil($\log_2(N_A)$) bits, where Ceil( ) is the round-up-to-nearest-integer function. In a predetermined wavelet decomposition scheme where the number of wavelet coefficients in the current subband is $N_B$, B=Ceil($\log_2(N_B)$) bits. In a predetermined wavelet decomposition scheme where the number of classes of wavelet coefficients is $N_C$, C=Ceil($\log_2(N_C)$) bits. In a predetermined wavelet decomposition scheme where the number of classes of wavelet coefficients is $N_D$, D=Ceil($\log_2(N_D)$) bits. For example, in a wavelet decomposition having 10 subbands, and 65536 coefficients in the current subband, and 4 classes and 32 bitplanes of accuracy, F=(A+B+C+D)=(4+16+2+5)= 27 bits.

The content of the control field in this embodiment provides a bitstream decoder the means to detect errors in a bitstream (214). This error detection property comes about as a result of the fact that data always appears in a wavelet-based image bitstream in a predetermined order, as governed by the bitstream syntax known to the decoder. This syntax provides a picture header which informs the decoder about the current configuration of any adjustable syntax parameters for the current bitstream. When a bitstream is corrupted by an error, such as a burst or packet loss error, the erroneous data may hinder the ability of a decoder to know its relative location to the start of the image. The control fields, which may be accurately decoded when a unique resynchronization marker is found, tell the decoder what the current bitstream position should be. If the decoder's internal record of the current subband, spatial address, class, or accuracy value does not match the control field data, an error may be detected. This functionality is crucial to bitstreams which are highly compressed by concatenating long series of variable length codewords or arithmetically encoded codewords together.

Once an error has been detected, the decoder is then enabled to localize (216) the error to a region between the last decoded resynchronization marker and the current resynchronization marker. For the purposes of localization, the start of the image file acts as the first resynchronization marker. If the encoded bitstream contains reversible variable length codewords, the codewords may be read in a reverse direction from the point of the current resynchronization marker, thus recovering data (218) and localizing the errors to a smaller number of bits. The localized region of error may then be concealed using an error concealment method (220) such as setting all coefficients in the localized error region to zero.

Figure 3:
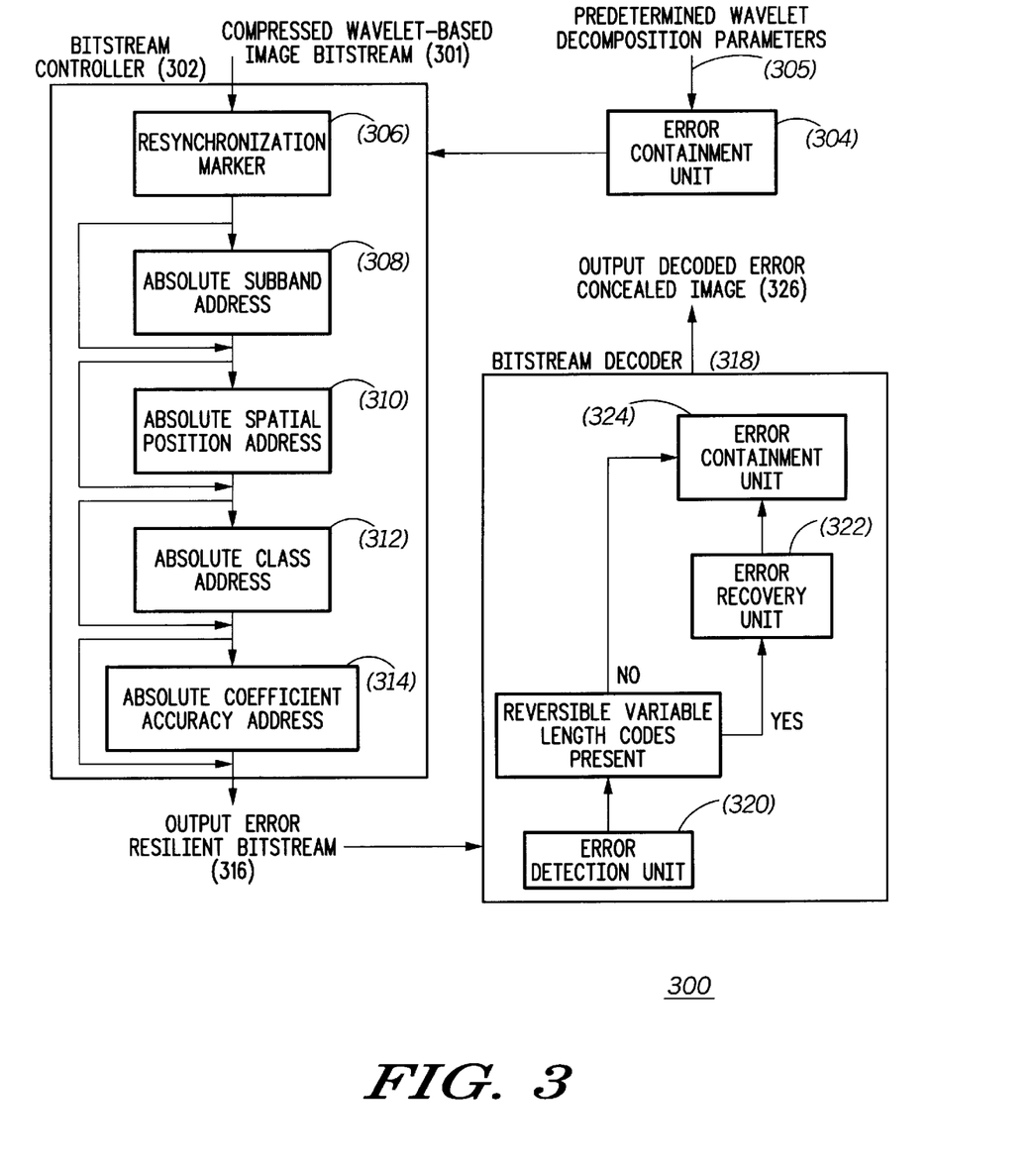
FIG. 3 is a block diagram of one preferred embodiment of a device in accordance with the present invention.

FIG. 3, numeral 300, is a block diagram of one preferred embodiment of a device in accordance with the present invention. The device is used for error control of a wavelet-based image codec, wherein wavelet coefficients are encoded using entropy coding. The device includes a bitstream controller (302) coupled to receive the compressed wavelet-based image bitstream (301). The bitstream controller is directed by an external parameter controller (304) incorporating predetermined wavelet decomposition parameters (305). The bitstream controller inserts resynchronization markers (306) and control information fields with an absolute restart address including at least one of an absolute subband address (308); an absolute spatial position address (310); an absolute class address (312); and an absolute coefficient accuracy address (314), into the compressed bitstream, according to commands from the external parameter controller. The control information provides decoding information for decoding at least a forward sequence of wavelet coefficients.

The bitstream controller (302) outputs an output error resilient bitstream (316), which is in turn coupled to a bitstream decoder (318). The bitstream decoder performs error detection in an error detection unit (320) in the bitstream decoder, optional error recovery in an error recovery unit (322) in the bitstream decoder when reversible variable length codes are present as indicated by the syntax of the output error resilient bitstream (316), and error localization and concealment in an error containment unit (324) in the bitstream decoder. The bitstream decoder outputs an output decoded error concealed image (326).

The absolute class address (312) in a predetermined wavelet coefficient classification scheme includes classification according to at least one of: classes of individual wavelet coefficients; classes of blocks of wavelet coefficients; and classes of multiresolution trees of wavelet coefficients. This enables grouping the compressed wavelet coefficients in the output error resilient bitstream according to a region or regions of interest in the image, or grouping the compressed wavelet coefficients according to a scheme which is beneficial to the improved compression of the wavelet-based image decomposition.

The error detection unit (320) is configured to detect an error in the absolute restart address wherein at least one of: detecting loss of entropy coding synchronization; detecting an incorrect absolute subband address; detecting an incorrect absolute spatial position address; detecting an incorrect absolute class address; and detecting an incorrect absolute coefficient accuracy value are present.

Figure 4:
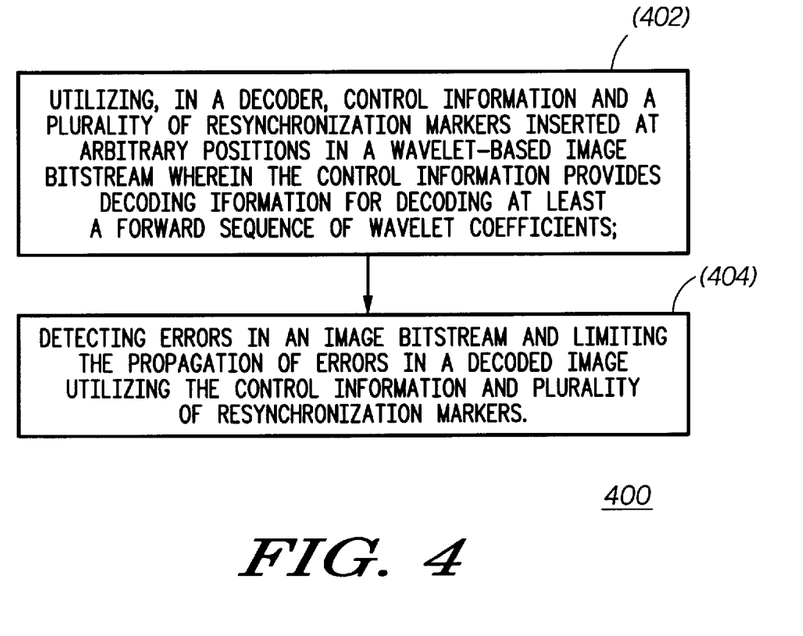
FIG. 4 is a flow chart showing another embodiment of a method in accordance with the present invention.

As shown in FIG. 4, numeral 400, in one embodiment, the method of the present invention may include the steps of: A) utilizing (402), in a decoder, control information and a plurality of resynchronization markers inserted at arbitrary positions in a wavelet-based image bitstream wherein the control information provides decoding information for decoding at least a forward sequence of wavelet coefficients; and B) detecting errors (404) in an image bitstream and limiting propagation of errors in a decoded image utilizing the control information and the plurality of resynchronization markers.

Where selected, the control information may include decoding information for decoding a backward sequence of wavelet coefficients utilizing reversible entropy codewords or a resetting of predetermined predictively encoded information at a boundary of bitstream segments and includes an absolute restart address in a predetermined wavelet-based image decomposition scheme.

Typically, the absolute restart address includes at least one of: A) an absolute subband address in a predetermined wavelet decomposition scheme; B) an absolute spatial position address in a predetermined wavelet subband coefficient scanning scheme; C) an absolute class address in a predetermined wavelet coefficient classification scheme; and D) an absolute coefficient accuracy value in a predetermined variable coefficient accuracy wavelet coding scheme The absolute class address in the predetermined wavelet coefficient classification scheme may include classification according to at least one of: A) classes of individual wavelet coefficients; B) classes of blocks of wavelet coefficients; and C) classes of multiresolution trees of wavelet coefficients.

Generally, detecting an error in the image bitstream may include detecting an error in the absolute restart address including at least one of: A) detecting loss of entropy coding synchronization; B) detecting an incorrect absolute subband address; C) detecting an incorrect absolute spatial position address; D) detecting an incorrect absolute class address; and E) detecting an incorrect absolute coefficient accuracy value are present.

Figure 5:
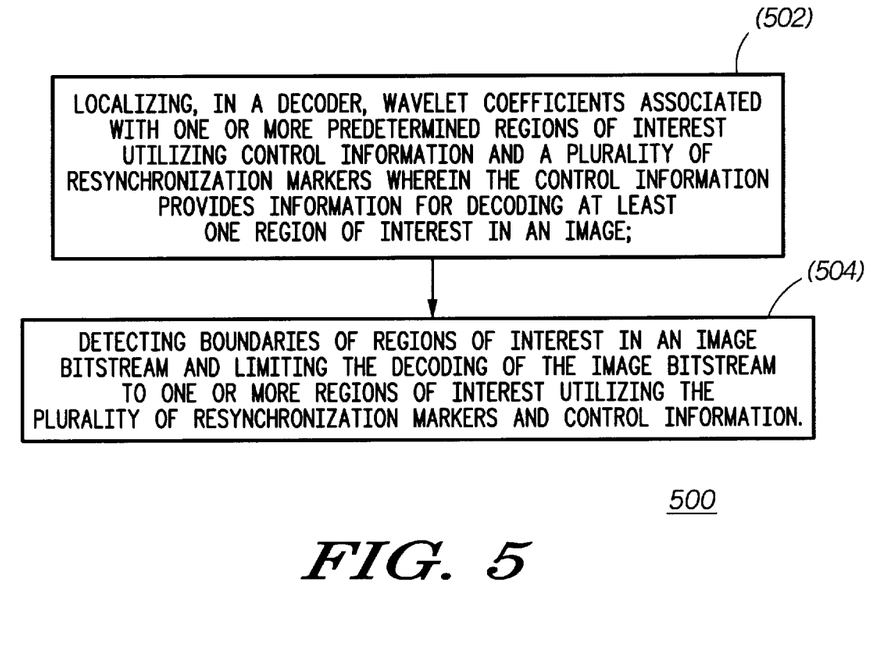
FIG. 5 is a flow chart showing another embodiment of steps of a method in accordance with the present invention.

FIG. 5, numeral 500, is a flow chart showing another embodiment of steps of a method of region of interest localization of a wavelet-based image codec in accordance with the present invention, wherein wavelet coefficients are encoded using entropy coding. In this embodiment, the steps include: A) localizing (502), in a decoder, wavelet coefficients associated with one or more predetermined regions of interest utilizing control information and a plurality of resynchronization markers wherein the control information provides information for decoding at least one region of interest in an image; and B) detecting boundaries (504) of regions of interest in an image bitstream and limiting the decoding of the image bitstream to at least one region of interest utilizing the plurality of resynchronization markers and the control information.

Implementation of the control information, the absolute restart address, and the absolute class address may be as described above.

Figure 6:
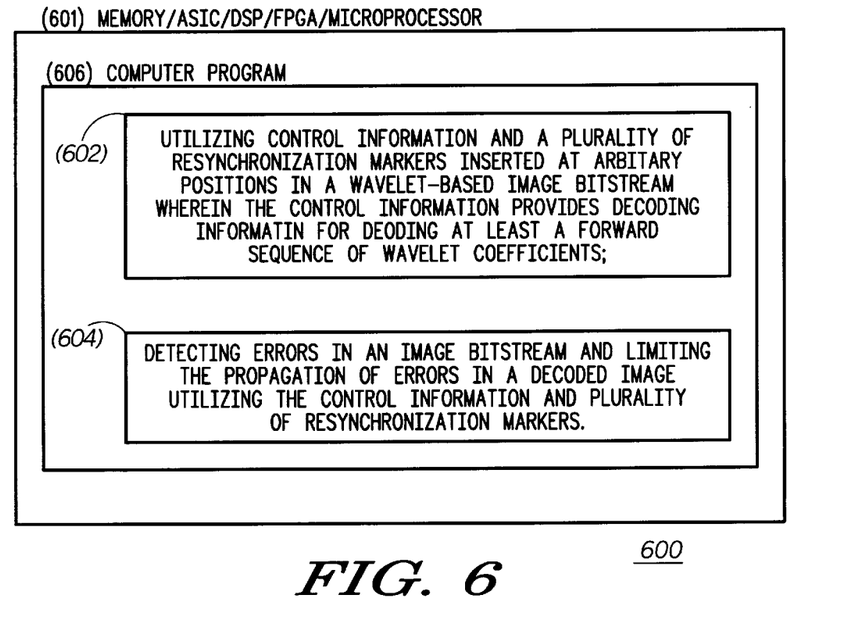
FIG. 6 is a block diagram showing a device directed by a computer program that is embodied in at least one of: a memory, an application specific integrated circuit; a digital signal processor; microprocessor and a field programmable gate array in accordance with the present invention.

As shown in FIGS. 5 and 6, the method may be selected to be a process (500, 600) whose steps are embodied in at least one of: A) an application specific integrated circuit (ASIC); B) a field programmable gate array; and C) a microprocessor; and D) a computer-readable memory that is/are arranged and configured to decode a wavelet-based image bitstream in accordance with the invention.

For example, as shown in FIG. 6, the present invention may be a device for error control of a wavelet-based image codec, wherein wavelet coefficients are encoded using entropy coding, wherein the device is directed by a computer program (606) that is embodied in at least one of: a memory, an application specific integrated circuit (ASIC); a digital signal processor (DSP); microprocessor; and a field programmable gate array (FPGA) (601). The computer program typically includes the steps of: 1) utilizing (602) control information and a plurality of resynchronization markers inserted at arbitrary positions in a wavelet-based image bitstream wherein the control information provides decoding information for decoding at least a forward sequence of wavelet coefficients; and 2) detecting (604) errors in an image bitstream and limiting the propagation of errors in a decoded image utilizing the control information and the plurality of resynchronization markers. Implementation of the control information, the absolute restart address, and the absolute class address may be as described above.

Typically, in the steps implemented by the computer program, detecting an error in the image bitstream includes detecting an error in the absolute restart address include at least one of: A) detecting loss of entropy coding synchronization; B) detecting an incorrect absolute subband address; C) detecting an incorrect absolute spatial position address; D) detecting an incorrect absolute class address; and E) detecting an incorrect absolute coefficient accuracy value are present.

Figure 7:
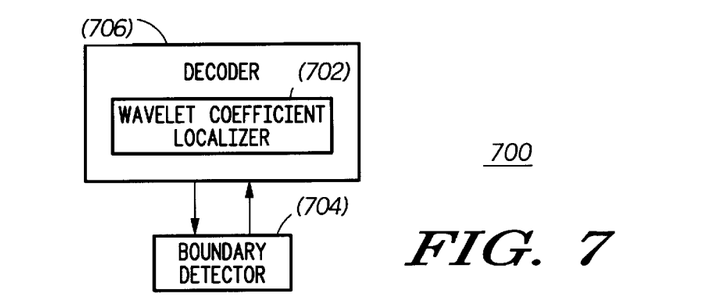
FIG. 7 is a block diagram of one embodiment of a device for region of interest localization of a wavelet-based image codec in accordance with the present invention, wherein wavelet coefficients are encoded using entropy coding.

FIG. 7, numeral 700, is a block diagram of one embodiment of a device for region of interest localization of a wavelet-based image codec in accordance with the present invention, wherein wavelet coefficients are encoded using entropy coding. The device includes: A) a decoder (706), coupled to a boundary detector, having a wavelet coefficient localizer (702) for localizing wavelet coefficients associated with one or more predetermined regions of interest utilizing control information and a plurality of resynchronization markers wherein the control information provides information for decoding at least one region of interest in an image; and B) the boundary detector (704), coupled to the decoder (706), for detecting boundaries of regions of interest in an image bitstream and limiting the decoding of the image bitstream to one or more regions of interest utilizing the plurality of resynchronization markers and control information. Implementation of the control information, the absolute restart address, and the absolute class address may be as described above.

Figure 8:
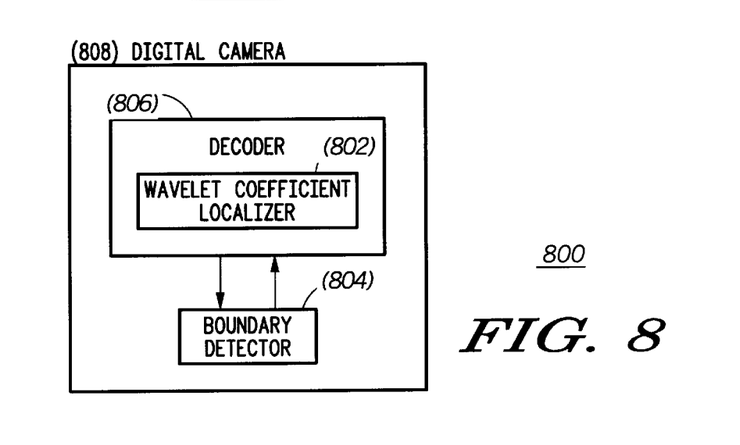
FIG. 8 is a block diagram showing a digital camera that includes the device for region of interest localization of a wavelet-based image codec, wherein wavelet coefficients are encoded using entropy coding, in accordance with the present invention.

As shown in FIG. 8, numeral 800, in a preferred embodiment a digital camera (808) may include the device for region of interest localization of a wavelet-based image codec, wherein wavelet coefficients are encoded using entropy coding, in accordance with the present invention. The device includes a decoder (806) with a wavelet coefficient localizer (802) and a boundary detector (804) coupled and operating as described above.

The method and device may be selected to be embodied in at least one of: A) an application specific integrated circuit; B) a field programmable gate array; and C) a microprocessor; and D) a computer-readable memory; arranged and configured to decode a wavelet-based image bitstream in accordance with the scheme described in greater detail above.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A method of error control of a wavelet-based image codec, wherein wavelet coefficients are encoded using entropy coding, comprising the steps of:

A) utilizing, in a decoder, control information and a plurality of resynchronization markers inserted at arbitrary positions in a wavelet-based image bitstream wherein the control information provides decoding information for decoding at least a forward sequence of wavelet coefficients;

B) detecting errors in an image bitstream and limiting propagation of errors in a decoded image utilizing the control information and the plurality of resynchronization markers, wherein the control information includes an absolute restart address in a predetermined wavelet-based image decomposition scheme, and wherein the absolute restart address includes at least one of:

C) an absolute subband address in a predetermined wavelet decomposition scheme;

D) an absolute spatial position address in a predetermined wavelet subband coefficient-scanning scheme;

E) an absolute class address in a predetermined wavelet coefficient classification scheme; and F) an absolute coefficient accuracy value in a predetermined variable coefficient accuracy wavelet-coding scheme.

2. The method of claim 1 wherein the control information includes decoding information for decoding a backward sequence of wavelet coefficients utilizing reversible entropy codewords.

3. The method of claim 1 wherein the control information includes a resetting of predetermined predictively encoded information at a boundary of bitstream segments.

4. The method of claim 1 wherein the absolute class address in the predetermined wavelet coefficient classification scheme includes classification according to at least one of:

A) classes of individual wavelet coefficients;

B) classes of blocks of wavelet coefficients; and

C) classes of multiresolution trees of wavelet coefficients.

5. The method of claim 1 wherein detecting an error in the image bitstream includes detecting an error in the absolute restart address including at least one of:

A) detecting loss of entropy coding synchronization;

B) detecting an incorrect absolute subband address;

C) detecting an incorrect absolute spatial position address;

D) detecting an incorrect absolute class address; and

E) detecting an incorrect absolute coefficient accuracy value are present.

6. The method of claim 1 wherein the method is a process whose steps are embodied in at least one of:

A) an application specific integrated circuit;

B) a field programmable gate array; and

C) a microprocessor; and

D) a computer-readable memory;

arranged and configured to decode a wavelet-based image bitstream in accordance with the scheme of claim 1.

7. A method of region of interest localization of a wavelet-based image codec, wherein wavelet coefficients are encoded using entropy coding, comprising the steps of:

A) localizing, in a decoder, wavelet coefficients associated with one or more predetermined regions of interest utilizing control information and a plurality of resynchronization markers wherein the control information provides information for decoding at least one region of interest in an image;

B) detecting boundaries of regions of interest in an image bitstream and limiting the decoding of the image bitstream to at least one region of interest utilizing the plurality of resynchronization markers and the control information;

wherein the control information includes an absolute restart address in a predetermined wavelet-based image decomposition scheme and wherein the absolute restart address includes at least one of:

C) an absolute subband address in a predetermined wavelet decomposition scheme;

D) an absolute spatial position address in a predetermined wavelet subband coefficient-scanning scheme;

E) an absolute class address in a predetermined wavelet coefficient region of interest classification scheme; and F) an absolute coefficient accuracy value in a predetermined variable coefficient accuracy wavelet-coding scheme.

8. The method of claim 7 wherein the control information includes a resetting of predetermined predictively encoded information at a boundary of bitstream segments.

9. The method of claim 7 wherein the absolute class address in the predetermined wavelet coefficient region of interest classification scheme includes classification according to at least one of:

A) classes of individual wavelet coefficients of a region of interest;

B) classes of blocks of wavelet coefficients of a region of interest; and

C) classes of multiresolution trees of wavelet coefficients of a region of interest.

10. The method of claim 7 wherein the method is a process whose steps are embodied in at least one of:

A) an application specific integrated circuit;

B) a field programmable gate array; and

C) a microprocessor; and

D) a computer-readable memory;

arranged and configured to decode one or more regions of interest of a wavelet-based image bitstream in accordance with the scheme of claim 8.

11. A device for error control of a wavelet-based image codec, wherein wavelet coefficients are encoded using entropy coding, wherein the device is directed by a computer program that is embodied in at least one of A–D:

A) a memory;

B) an application specific integrated circuit;

C) digital signal processor; and

D) a field programmable gate array, and the computer program includes the steps of:

E) utilizing control information and a plurality of resynchronization markers inserted at arbitrary positions in a wavelet-based image bitstream wherein the control information provides decoding information for decoding at least a forward sequence of wavelet coefficients;

F) detecting errors in an image bitstream and limiting the propagation of errors in a decoded image utilizing the control information and the plurality of resynchronization markers wherein the control information includes an absolute restart address in a predetermined wavelet-based image decomposition scheme, and wherein the absolute restart address includes at least one of:

G) an absolute subband address in a predetermined wavelet decomposition scheme;

H) an absolute spatial position address in a predetermined wavelet subband coefficient-scanning scheme;

I) an absolute class address in a predetermined wavelet coefficient classification scheme; and J) an absolute coefficient accuracy value in a predetermined variable coefficient accuracy wavelet-coding scheme.

12. The device of claim 11 wherein the control information computed by a resynchronization controller defines a boundary of segments of wavelet coefficients.

13. The device of claim 11 wherein the absolute class address in the predetermined wavelet coefficient classification scheme includes classification according to at least one of:

A) classes of individual wavelet coefficients;

B) classes of blocks of wavelet coefficients; and

C) classes of multiresolution trees of wavelet coefficients.

14. The device of claim 11 wherein, in the steps implemented by the computer program, detecting an error in the image bitstream includes detecting an error in the absolute restart address including at least one of:

A) detecting loss of entropy coding synchronization;

B) detecting an incorrect absolute subband address;

C) detecting an incorrect absolute spatial position address;

D) detecting an incorrect absolute class address; and

E) detecting an incorrect absolute coefficient accuracy value are present.

15. A device for region of interest localization of a wavelet-based image codec, wherein wavelet coefficients are encoded using entropy coding, comprising:

A) a decoder, having a wavelet coefficient localizer for localizing wavelet coefficients associated with one or more predetermined regions of interest utilizing control information and a plurality of resynchronization markers wherein the control information provides information for decoding at least one region of interest in an image; and B) a boundary detector, coupled to the decoder, for detecting boundaries of regions of interest in an image bitstream and limiting the decoding of the image bitstream to one or more regions of interest utilizing the plurality of resynchronization markers and control information wherein the control information includes an absolute restart address in a predetermined wavelet-based image decomposition scheme, and wherein the absolute restart address includes at least one of:

C) an absolute subband address in a predetermined wavelet decomposition scheme;

D) an absolute spatial position address in a predetermined wavelet subband coefficient-scanning scheme;

E) an absolute class address in a predetermined wavelet coefficient region of interest classification scheme; and F) an absolute coefficient accuracy value in a predetermined variable coefficient accuracy wavelet-coding scheme.

16. The device of claim 15 wherein the control information defines a resetting of predetermined predictively encoded information at a boundary of bitstream segments.

17. The device of claim 13 wherein the absolute class address in the predetermined wavelet coefficient region of interest classification scheme includes classification according to at least one of:

A) classes of individual wavelet coefficients of a region of interest;
   B) classes of blocks of wavelet coefficients of a region of interest; and
   C) classes of multiresolution trees of wavelet coefficients of a region of interest.

18. A digital camera having a device for region of interest localization of a wavelet-based image codec, wherein wavelet coefficients are encoded using entropy coding, wherein the device comprises:

A) a decoder having a wavelet coefficient localizer, for localizing wavelet coefficients associated with one or more predetermined regions of interest utilizing control information and a plurality of resynchronization markers wherein the control information provides information for decoding at least one region of interest in an image; and
   B) a boundary detector, coupled to the decoder, for detecting boundaries of regions of interest in an image bitstream and limiting the decoding of the image bitstream to one or more regions of interest utilizing the plurality of resynchronization markers and control information.

wherein the control information includes an absolute restart address in a predetermined wavelet-based image decomposition scheme, and wherein the absolute restart address includes at least one of:

C) an absolute subband address in a predetermined wavelet decomposition scheme;
   D) an absolute spatial position address in a predetermined wavelet subband coefficient-scanning scheme;
   E) an absolute class address in a predetermined wavelet coefficient region of interest classification scheme; and
   F) an absolute coefficient accuracy value in a predetermined variable coefficient accuracy wavelet-coding scheme.

19. The digital camera of claim 18 wherein the control information includes a resetting of predetermined predictively encoded information at a boundary of bitstream segments.

20. The digital camera of claim 18 wherein the absolute class address in the predetermined wavelet coefficient region of interest classification scheme includes classification according to at least one of:

A) classes of individual wavelet coefficients of a region of interest;
   B) classes of blocks of wavelet coefficients of a region of interest; and
   C) classes of multiresolution trees of wavelet coefficients of a region of interest.

* * * * *